(12) United States Patent
Dupak

(10) Patent No.: US 6,506,041 B1
(45) Date of Patent: Jan. 14, 2003

(54) PEROGIE MAKER

(76) Inventor: Iolanda Dupak, 4900 4th St. NE., Minneapolis, MN (US) 55421

( * ) Notice: Subject to any disclaimer, the term of this patent is extended or adjusted under 35 U.S.C. 154(b) by 32 days.

(21) Appl. No.: 09/663,207

(22) Filed: Sep. 15, 2000

(51) Int. Cl.$^7$ .............................. A21D 13/00
(52) U.S. Cl. ................ 425/298; 425/318; 426/279; 426/283
(58) Field of Search ................ 425/298, 318; 30/123, 124, 178; 99/380, 381, 382, 383; 426/279, 283, 502, 517; 249/92, 170; D7/674

(56) References Cited

U.S. PATENT DOCUMENTS 4,112,127 A * 9/1978 Popeil .................. 426/283
4,363,614 A * 12/1982 Zaremba ................ 249/170
4,516,923 A * 5/1985 Lifshitz et al. ........... 249/12
4,574,088 A * 3/1986 Bowden ................ 249/121

* cited by examiner

Primary Examiner—Jan H. Silbaugh
Assistant Examiner—Donald Heckenberg

(57) ABSTRACT

Disclosed is a perogie maker for producing individual perogies from a single layer of dough. The perogie maker consists of round, hollow cylinders attached to one another at the ends of the cylinders by rotatable hinges. The cylinders have alternating raised and lowered notches, and a ridge surrounding the outside of at least part of the cylinder which is capable of cutting through dough. When handles attached to the cylinders are brought together the raised notches close on lowered notches and a layer of dough is folded as such to produce sealed perogies, with excess dough being trimmed by the ridge.

1 Claim, 2 Drawing Sheets

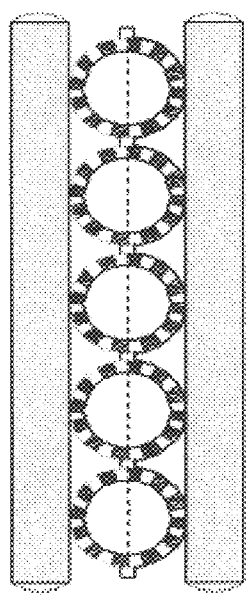
Figure 2-1
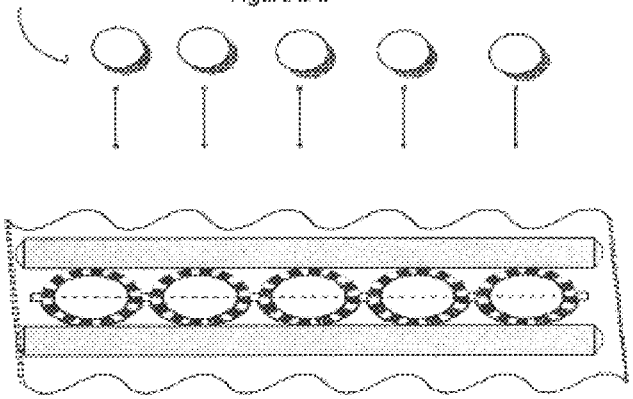
Figure 2-2
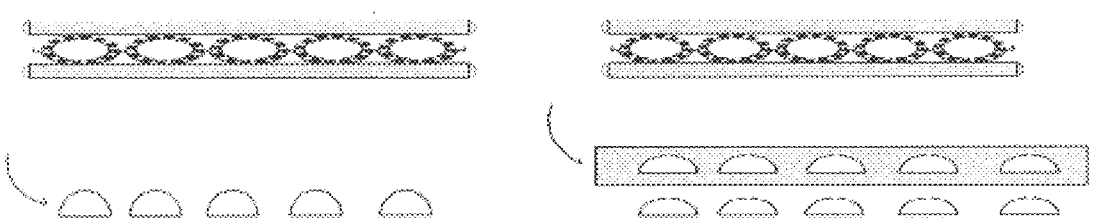
Figure 2-3
Figure 2-4

PEROGIE MAKER

SPECIFICATION

This invention is a multi-purpose press apparatus, that allows a single layer of dough capsule to produces individual perogies.

A single dough layer is placed onto the mold spanning the cylinders, and over the perimeter of their molding notches. The selected filling is then distributed in a varied manner across the entire cylinder opening. The sections are then closed together, into a locked position. This thereupon allows a seal to occur, by letting the molds raised cylinder notches on the upper cylinder, close on the lower notches (opposite non-raised notch) process to occur and the thin ¼ offset cutting ridge surrounding the outside parameters of the upper cylinder, to slice excess dough. The levers then are re-opened and the apparatus ejects the completed product(s) from the posterior of the cylinders.

This process, once completed, can be repeated numerous times until the desired amount of perogies are produced. Since each seal remains constant (tight) regardless of the amount of contents (filling) used, it is not dependent on the type of filling used.

BRIEF DESCRIPTION OF THE DRAWINGS

FIGS. 2-1, 2-2, 2-3, and 2-4 show the method of using the perogie maker.

DETAILED DESCRIPTION

Figure 1:
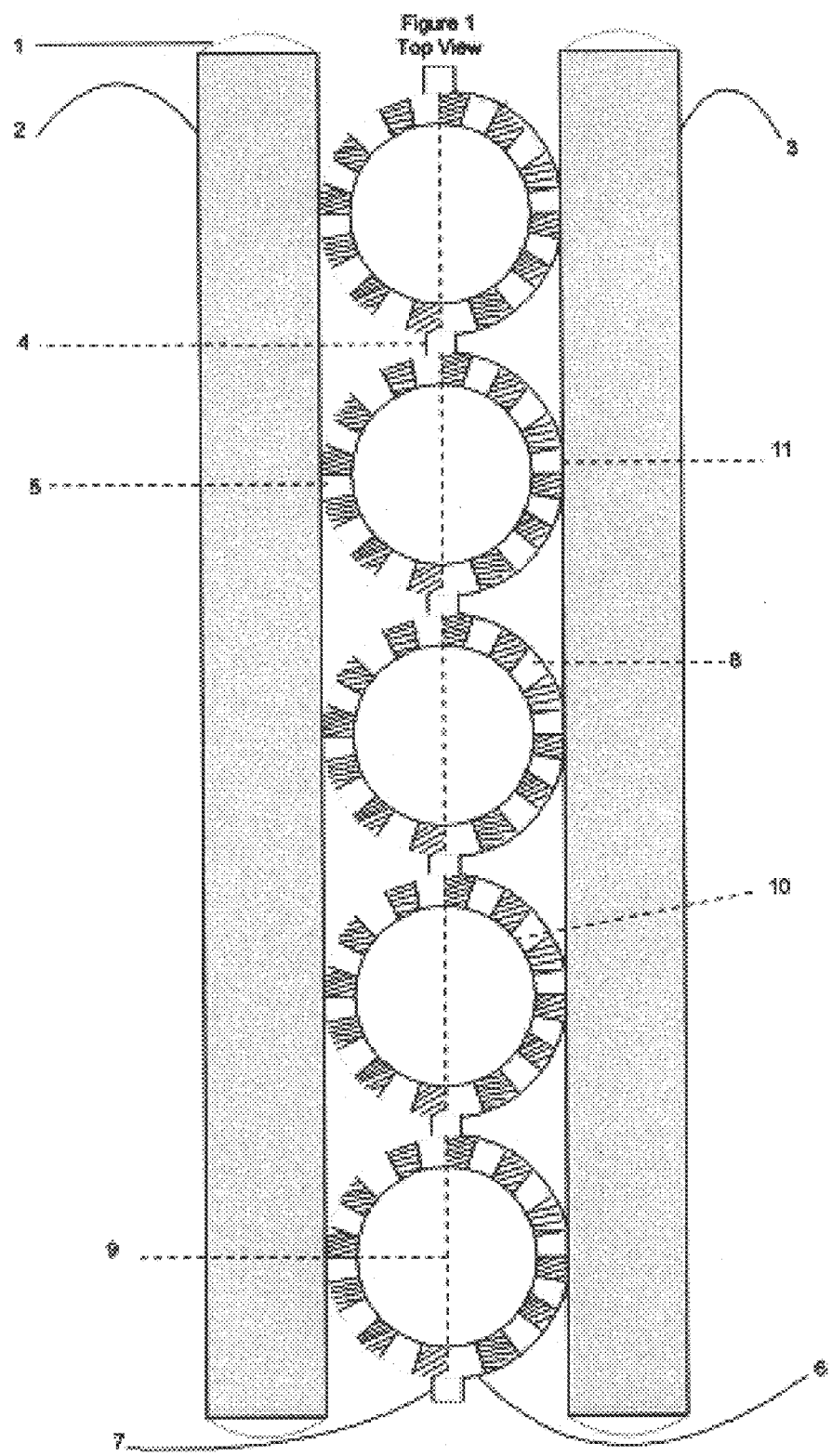
FIG. 1 is a top view of the perogie maker.

As Shown in FIG. 1 Top View of the Invention

Rounded carrying grip edges (1) of the apparatus.

The two carrying grips (2, 3) on the outsides of the cylinders are lightweight wooded or plastic grips assembled to each of the cylinders actually mounted into center slots. The grips are of equal length and width, to provide ease for carrying and using, or for minimal force and effort in the horizontal sealing process.

The ridged press cylinder hinge (connector) (4) attached to each cylinder of the apparatus.

Lower portion of the cylinder device that when in a closed position will create a seal onto a raised edge (8) sealing ridge.

¼ offset cutting ridge surrounding the outside parameters of the each upper cylinder, to slice excess dough.

Cylinder edge locking hinge (connectors) (7).

Upper portion of the cylinder device that when in a closed position will create a seal onto a lowered edge (5) sealing ridge.

Hollowed center (9) on each cylinder of the apparatus.

Inner portion (10) of the cylinder non-ridged flatted, (smoothed) for sealing.

Outer edge (11) of the cylinders are directly attached to the carrying grip(s) on each of the cylinders.

As Shown in FIG. 2 of the Invention

FIG. 2-1: Apparatus prior to placing single dough layer onto the mold spanning the five cylinders.

FIG. 2-2: Dough is then placed onto open cylinders, and filling is deposited in, and distributed (spooned) upon the center of each cylinder, reducing the filling amount on each cylinder.

FIG. 2-3: The carrying grips are closed and seal is made, and the dough and fillings are compressed and molded.

FIG. 2-4: When the dough product has been molded, the remaining excess dough and trimming are removed and the apparatus ejects the completed product(s) from the posterior of the cylinders.

DESCRIPTION

The ridged press portions connected to the grips of the apparatus, are two identical pieces with opposite opposing sealing ridges per half, with a hollowed center when in the open position, with adjacent connectors that rotate attaching the five cylinders. In a standard use of this device, place the invention on a flattened surface, extend a layer of dough the length of the device and the width of the cylinders. Spoon an ample amount of the selected contents into the center of each cylinder. With one or both hands, close the leverage grips into the locked position and clean away excess. Verify that the grips are completely sealed and then re-open and release the completed product.

What is claimed is:

1. A perogie maker for producing individual perogies from a single layer of dough, the perogie maker consisting of:
    round hollow centered cylinders attached to one another at the ends of the cylinders by rotatable hinges, with the cylinders having alternating raised and lowered notches,
    two handles attached to the cylinders,
    and a ridge surrounding the outside of at least part of the cylinder, the ridge capable of cutting through dough,
    wherein when the handles are brought together the raised notches close on the lowered notches and a layer of dough is folded as such to produce individual sealed perogies, with excess dough being trimmed by the ridge.

* * * * *